United States Patent

Geertson

[11] Patent Number: 6,158,524
[45] Date of Patent: Dec. 12, 2000

[54] CULTIVATOR COMPONENT CLAMPING ASSEMBLY

[76] Inventor: Phillip W. Geertson, 16645 Burroughs Rd., Adrian, Oreg. 97901

[21] Appl. No.: 09/493,461

[22] Filed: Jan. 26, 2000

Related U.S. Application Data

[63] Continuation-in-part of application No. 09/089,747, Jun. 2, 1998, Pat. No. 6,095,255.

[51] Int. Cl.[7] .................................................. A01B 35/26
[52] U.S. Cl. ........................ 172/763; 172/753; 403/374.1; 403/379.4; 403/409.1
[58] Field of Search ........................... 172/753, 762, 172/763, 773; 403/373, 374.1, 379.4, 355, 409.1

[56] References Cited

U.S. PATENT DOCUMENTS

| | | | |
|---|---|---|---|
| 14,013 | 1/1856 | Cooper | 172/763 |
| 82,835 | 10/1868 | Hixson | 172/763 |
| 120,055 | 10/1871 | Gibson | 172/763 |
| 638,739 | 12/1899 | Morrison | 172/763 |
| 791,327 | 5/1905 | Dale | 403/347 |
| 906,693 | 12/1908 | Cook | 403/409.1 X |
| 949,696 | 2/1910 | Bradley | 172/763 |
| 1,043,277 | 11/1912 | Weaver | 172/271 |
| 1,345,209 | 6/1920 | Martin | 430/409.1 X |
| 1,367,644 | 2/1921 | Varner | 403/347 |
| 1,622,619 | 3/1927 | Warren | 172/763 |
| 1,635,442 | 7/1927 | Sigurd | 172/271 |
| 3,722,932 | 3/1973 | Dougall | 403/379.4 |
| 4,032,245 | 6/1977 | Woodruff | 403/385 |
| 4,187,035 | 2/1980 | Colburn | 403/409.1 X |
| 4,452,320 | 6/1984 | Meiners | 172/708 |
| 4,576,239 | 3/1986 | Launder | 172/751 |
| 5,785,461 | 7/1998 | Lambert | 403/409.1 X |

*Primary Examiner*—Victor Batson
*Attorney, Agent, or Firm*—Joseph W. Holland

[57] ABSTRACT

A cultivator component clamping assembly for attaching a component to an implement crossbar having a plurality of faces includes a pair of generally C-shaped members each having a throat opposing a first face of the implement bar. Each C-shaped member also include a first leg and a second leg attached to and extending from the throat for placement about the implement crossbar. A retaining member is attached near the distal ends of the first and second legs and opposite a second face of the implement crossbar. The clamping assembly also includes a wedge inserted between the inclined face of the retaining member and a second face of the of the implement crossbar. A first keeper member attached between the first legs and a second keeper member attached between the second legs. The retaining member is held between the first keeper member and the second keeper member and the wedge is inserted between the inclined face of the retaining member and a face of the implement crossbar opposing the inclined face of the retaining member.

14 Claims, 10 Drawing Sheets

CULTIVATOR COMPONENT CLAMPING ASSEMBLY

This application is a Continuation-in-Part of application Ser. No. 09/089,747, filed Jun. 2, 1998, now U.S. Pat. No. 6,095,255.

BACKGROUND

1. Technical Field

This invention relates generally to cultivating devices and, more specifically, to a clamping assembly for clamping various subassembly component parts of a cultivator, one to another.

2. Background of the Invention

A cultivator typically includes a variety of component parts which are joined together for towing behind a tractor or other source of motive force, for breaking, tilling or cultivating earth, typically for agricultural purposes. The component parts may include: a crossbar having a hitch assembly for attachment to the tractor; a support mechanism, typically wheel assemblies, for supporting the cultivating device; and a crossbar to which a variety of cultivating tools, including spades, disks, harrows, teeth or plows may be attached. The cultivating tools are commonly attached to a tool shank which mounts to the cultivator crossbar. Each tool shank is typically attached to the crossbar in a fashion that permits vertical adjustment of the tool shank relative to the crossbar. In addition, the cultivating device may include additional crossbars so that the total number of cultivating tools being towed by the tractor may be increased.

Figure 8:
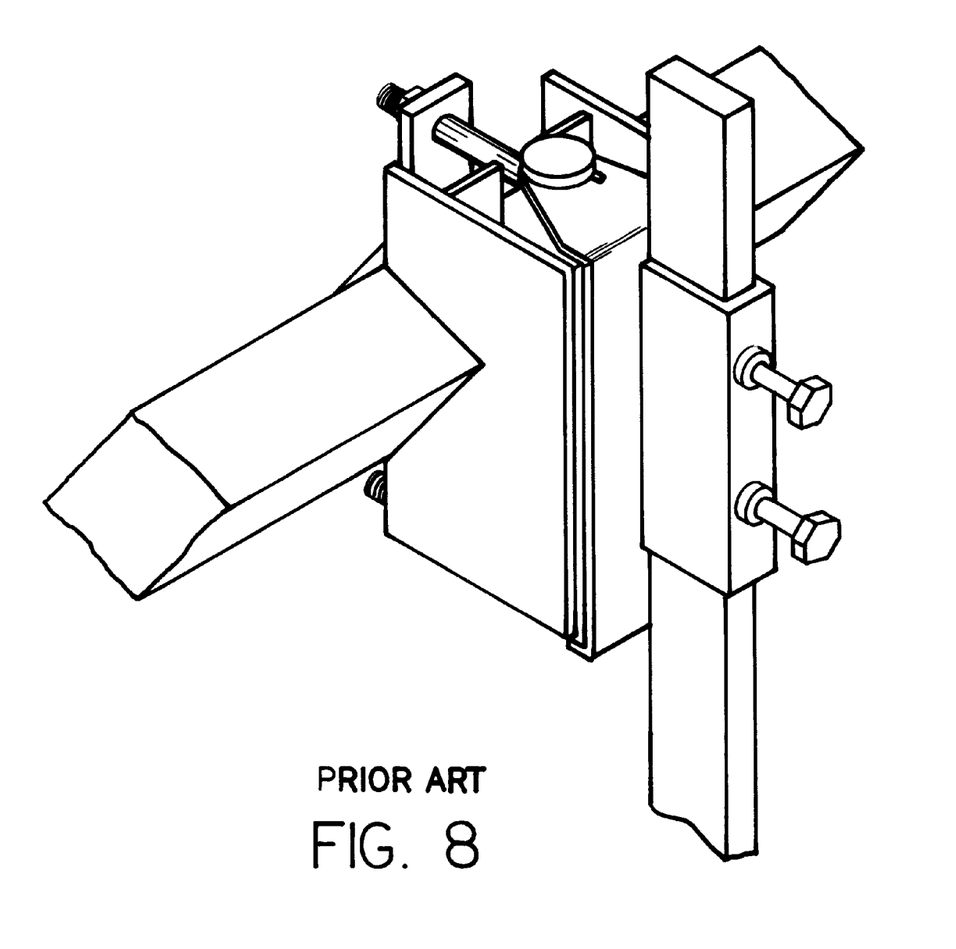
FIG. 8 is a perspective representational view of a cultivator component clamping assembly according to the prior art.

Historically, each of the cultivator component parts has attached, one to another, employing threaded connectors. For instance, a clamping assembly for attaching a tool shank to a crossbar allowing horizontal adjustment of the tool's location along the crossbar includes typically, one or more generally U-shaped bolts and one or more opposing clamping shims which are secured about the crossbar using threaded connectors. Similarly, the vertical adjustment of the tool shank includes typically, an eye or elongated slot formed in the opposing clamping member and may include an eye or elongated slot formed in the opposing clamping shim through which the tool shank passes. The tool shank is fixed in position by one or more screws which pass through the exterior wall of the slot bearing upon the face of the tool shank. Oftentimes these types of connections will loosen with use or cause distortion in the tool shank at the point that the screw is tightened against the shank. FIG. 8 shows a typical device according to the prior art for attaching an implement to a crossbar.

Most often, a wide variety of threaded connectors including screws, bolts and a variety of nuts or other custom manufactured components will be used in order to assemble the various component parts of a cultivator assembly. The process of set-up, maintenance, adjustment and/or use of the cultivator and its various component parts may be a time consuming and tedious task. Typically, these functions have required that operators and mechanics have access to a substantial tool selection as well as an inventory of spare connectors. This situation is only aggravated by the fact that threaded connectors, when put in service, particularly in outdoor environments where excavation is occurring, having a tendency to become damaged, rusted or become fouled with other debris.

What is needed is a simple clamping device which can be employed for assembling the variety of component parts which comprise a cultivator. What is also needed is a means for effecting such attachment and assembly which is relatively inexpensive to manufacture.

What is also needed is a device which provides a positive clamping mechanism over a greater surface area to maximize the holding or clamping force of the attachment means, thereby reducing or eliminating the propensity for parts to vibrate out of adjustment, loosen after continued use, or distort as a result of the method of attachment.

SUMMARY OF THE INVENTION

According to the present invention, a cultivator component clamping assembly includes a clamping assembly for attaching a component to an implement crossbar having a plurality of faces. The clamping assembly includes a pair of generally C-shaped members each having a throat opposing a first face of the implement bar. Each C-shaped member also include a first leg and a second leg attached to and extending from the throat for placement about the implement crossbar.

In one embodiment of the invention, a retaining member is attached near the distal ends of the first and second legs and opposite a second face of the implement crossbar.

In either case, the clamping assembly also includes a wedge removably insertable between the inclined face of the retaining member and a second face of the of the implement crossbar. Alternately, the inner face of the throat of the generally C-shaped brace may be configured having an inclined face which opposes the first face of the implement crossbar. In this case the wedge is inserted between the inclined face of the throat of the generally C-shaped brace and the first face of the implement crossbar.

The clamping assembly also includes a first keeper member attached between the first legs and a second keeper member attached between the second legs.

In one embodiment of the invention, the keeper member includes a first pin attached between the first legs of the pair of generally C-shaped members and a second pin attached between the second legs of the pair of generally C-shaped members. The retaining member is retained against the first pin and the second pin and the wedge is inserted between the inclined face of the retaining member and a face of the implement crossbar opposing the inclined face of the retaining member.

In another embodiment of the invention, the first legs and the second legs of the pair of generally C-shaped members include a connection member which is engagable with a cooperating member connected to the retaining member.

The clamping assembly may also include a tool shank attached to a tool. The tool shank may be inserted between the inclined face of the retaining member and the second face of the implement crossbar. Alternately, the tool shank may act as a retainer member being inserted against the keepers, between the keepers and the second face of the implement bar. In addition, the tool shank may be inserted between the throat of the C-shaped brace and the first face of the implement bar.

In one embodiment of the invention, the first leg includes a first pair of spaced bars attached to and extending from the throat of the generally C-shaped clamp. Similarly, the second leg includes a second pair of spaced bars attached to and extending from the throat of the generally C-shaped clamp. In this embodiment of the invention, the first keeper includes a first pin attached between the first pair of spaced bars near the distal ends of the first pair of spaced bars, and the second keeper includes a second pin attached between the second pair of spaced bars near the distal ends of the second pair of spaced bars. The retaining member is insertable between the pairs of spaced bars and is positioned against the first and second pins.

The retaining member may be configured having a pair of notches configured to allow positioning of the retaining member against the first pin and the second pin. In one embodiment of the invention, the depth of the first notch has a greater depth than the depth of the second notch. This configuration, when the retaining member is positioned against the first pin and the second pin, results in an inclined presentation of the retaining member inner face or inclined face.

The assembly described may be used for attaching a tool, including a tool shank, to a cultivator assembly. In this instance, the tool shank may be inserted between the second face of the crossbar and the inclined face of the retaining member. A wedge is driven tightly between the outer face of the tool shank and the inclined face of the retaining member, securing the tool shank with its attached tool to the cultivator assembly. Alternately, the tool shank may be inserted between the throat of the C-brace and the first face of the cultivator crossbar. In this case, the throat of the C-brace is configured having an inclined face.

Horizontal and vertical adjustment of the tool simply requires loosening the wedge and sliding the component to the desired location along the crossbar and the desired extension of the tool shank relative to the crossbar and driving the wedge to retighten the assembly. The large surface to surface area contact between the C-brace throat, the crossbar, the tool shank, the inclined face of the retaining member and the surfaces of the wedge provide a positive and secure means of assembly. The potential for distortion of component parts due to the method of attachment is effectively eliminated.

This clamping assembly may also be used to attach additional crossbars to the cultivator assembly in sequence. In this embodiment of the invention, a spacer bar clamp assembly having a C-brace at either of its two ends is employed for attaching a first crossbar to a second crossbar in a spaced apart relationship.

The cultivator component clamping assembly may also be used to attach a hitch plate to the crossbar. In this embodiment of the invention, a pin plate providing a point to which the towing arms of the tractor may be attached is secured to the crossbar using a clamp assembly including a C-brace having a throat and a pair of legs attached to and extending from the throat for placement about a crossbar. The hitch plate clamp assembly also includes a retaining member located at the distal end of each leg and a wedge for securing the clamp to the crossbar.

In yet another embodiment of the invention, the cultivator component clamping assembly may be adapted to a crossbar having a rotated orientation, presenting a diamond cross-sectional configuration. A diamond bar clamp assembly may include a first adapter member and a second adapter member each having a shaped face which is configured to permit surface to surface contact between the face of the adapters and a pair of adjoining faces of the diamond crossbar.

The entire cultivator component clamping assembly described herein may be formed of mild steel thereby reducing the cost of manufacture. Other advantages will become apparent to those skilled in the art from the following detailed description read in conjunction with the appended claims attached hereto.

It should be understood that the referenced drawings are not to scale and are intended as representations. The drawings are not necessarily intended to depict the functional and structural details of the invention, which can be determined by one of skill in the art by examination of the descriptions and claims provided herein.

DETAILED DESCRIPTION OF THE INVENTION

Figure 1:
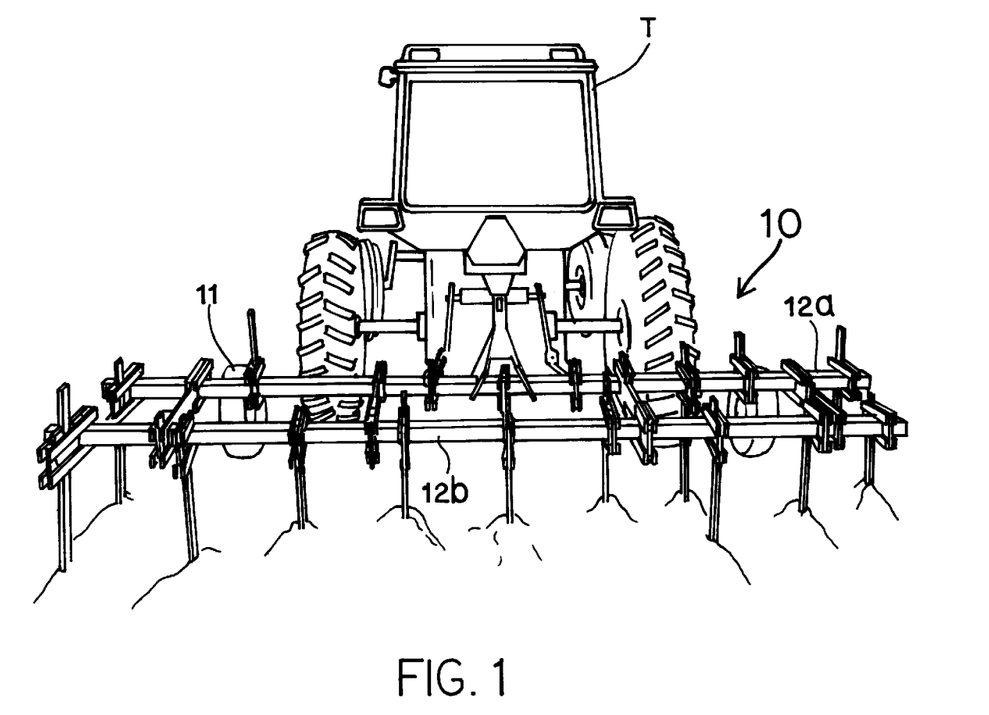
FIG. 1 is a perspective representational view of a cultivator according to the present invention.

Referring now to FIGS. 1 through 10, a cultivator component clamping assembly according to the present invention will be more fully described. Referring to FIG. 1, cultivator assembly 10 is shown attached to and being towed by tractor T. Cultivator assembly 10 includes wheel assemblies 11 for supporting and transporting cultivator assembly 10. Cultivator assembly 10 also includes first crossbar 12a and second crossbar 12b.

Figure 2:
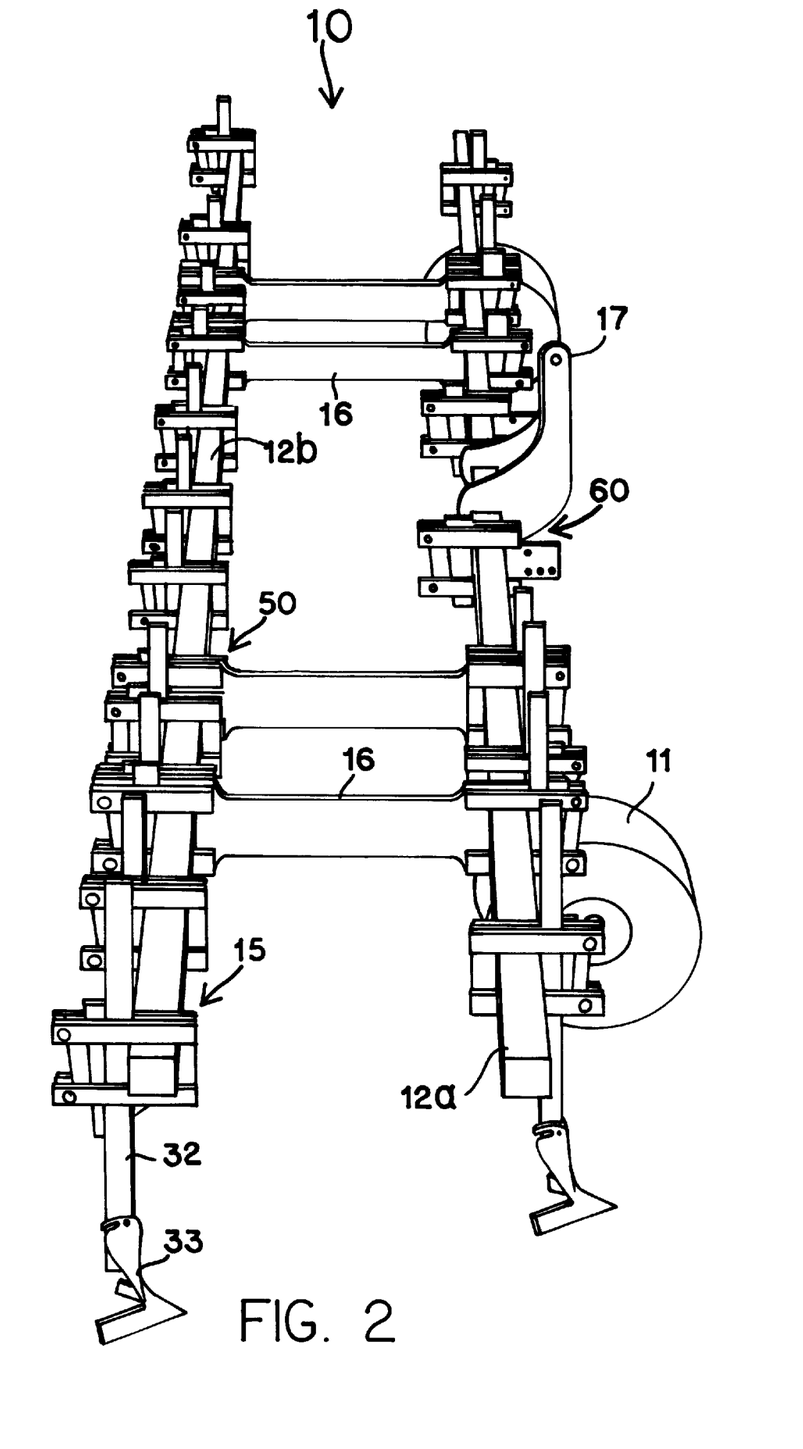
FIG. 2 is a perspective representational view of a cultivator according to the present invention.

Referring to FIG. 2, cultivator assembly 10 is shown in a representational perspective view. Cultivator assembly 10 includes wheel assemblies 11 attached to front crossbar 12a. Rear crossbar 12b is attached to front crossbar 12a by a plurality of spacer bars 16. Cultivator assembly 10 also includes a plurality of tool shank clamp assemblies 15 for mounting tool shanks 32 having tools 33 to front crossbar 12a and rear crossbar 12b. Cultivator assembly 10 also includes a plurality of spacer bar clamp assemblies 50 for attaching spacer bars 16 at either of its two ends to front crossbar 12a and rear crossbar 12b. Cultivator assembly 10 also includes hitch plate clamp assembly 60 for attaching a hitch pin plate to front crossbar 12a and hitch plate 17 for attaching a hydraulic arm.

Figure 3:
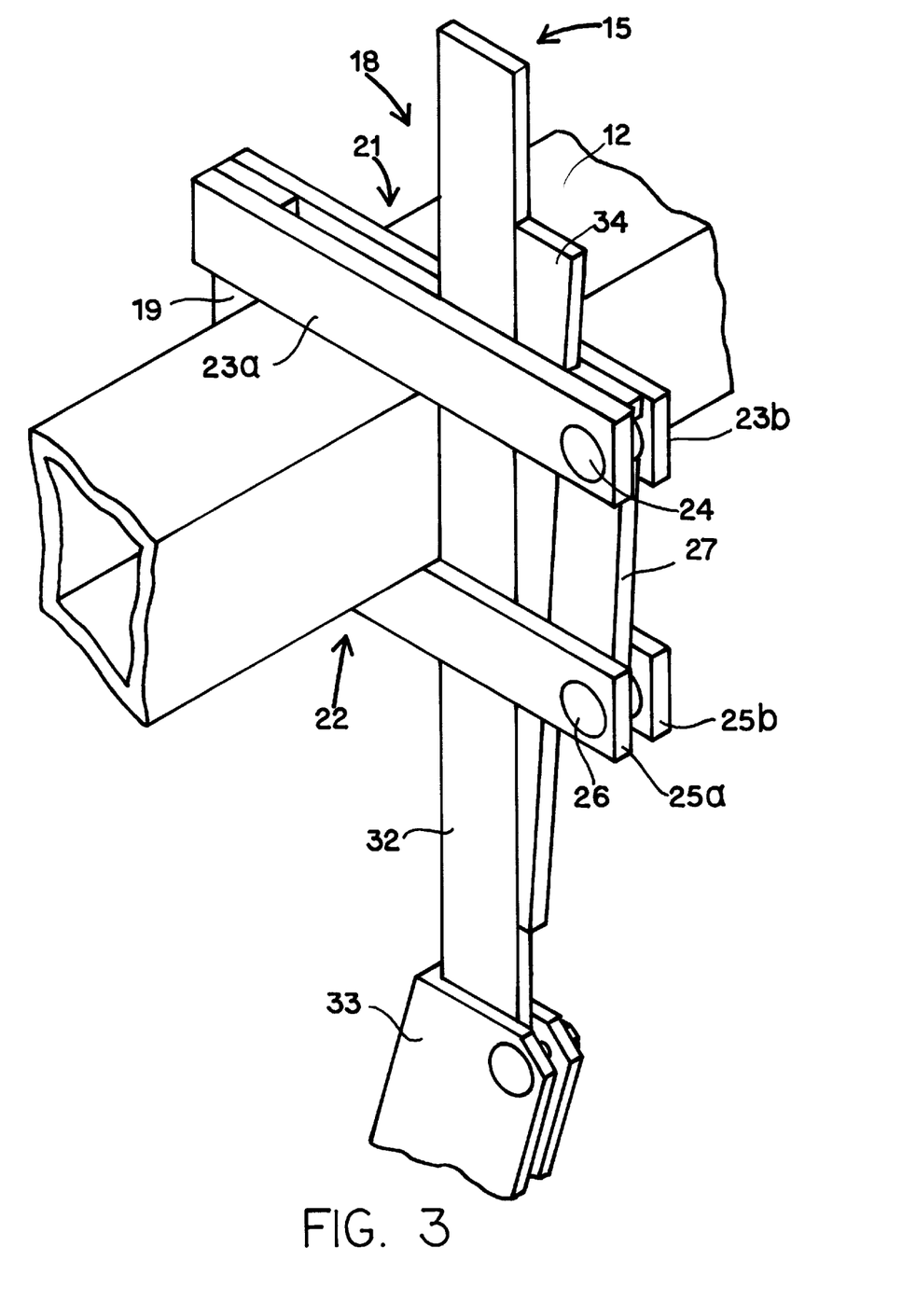
FIG. 3 is a perspective representational view of a cultivator component clamping assembly according to the present invention.

Referring to FIG. 3, tool shank assembly 15 is shown including C-brace 18 having throat 19. First leg 21 is shown attached to and extending from a first end of throat 19 and second leg 22 is shown attached to and extending from a second end of throat 19. First leg 21 includes first pair of spaced bars 23a and 23b and second leg 22 includes second pair of spaced bars 25a and 25b. First pin 24 is shown attached to and located near the distal ends of first pair of spaced bars 23a and 23b. Similarly, second pin 26 is shown attached to and located near the distal ends of second pair of spaced bars 25a and 25b. Tool shank 32 is shown inserted between first pair of spaced bars 23a and 23b and second pair of spaced bars 25a and 25b with the inner face of tool shank 32 located and positioned against the second face of crossbar 12. Wedge 34 is inserted between the outer face of tool shank 32 and the inclined face of bar 27. Tool 33 is attached to and depends from tool shank 32.

Figure 4:
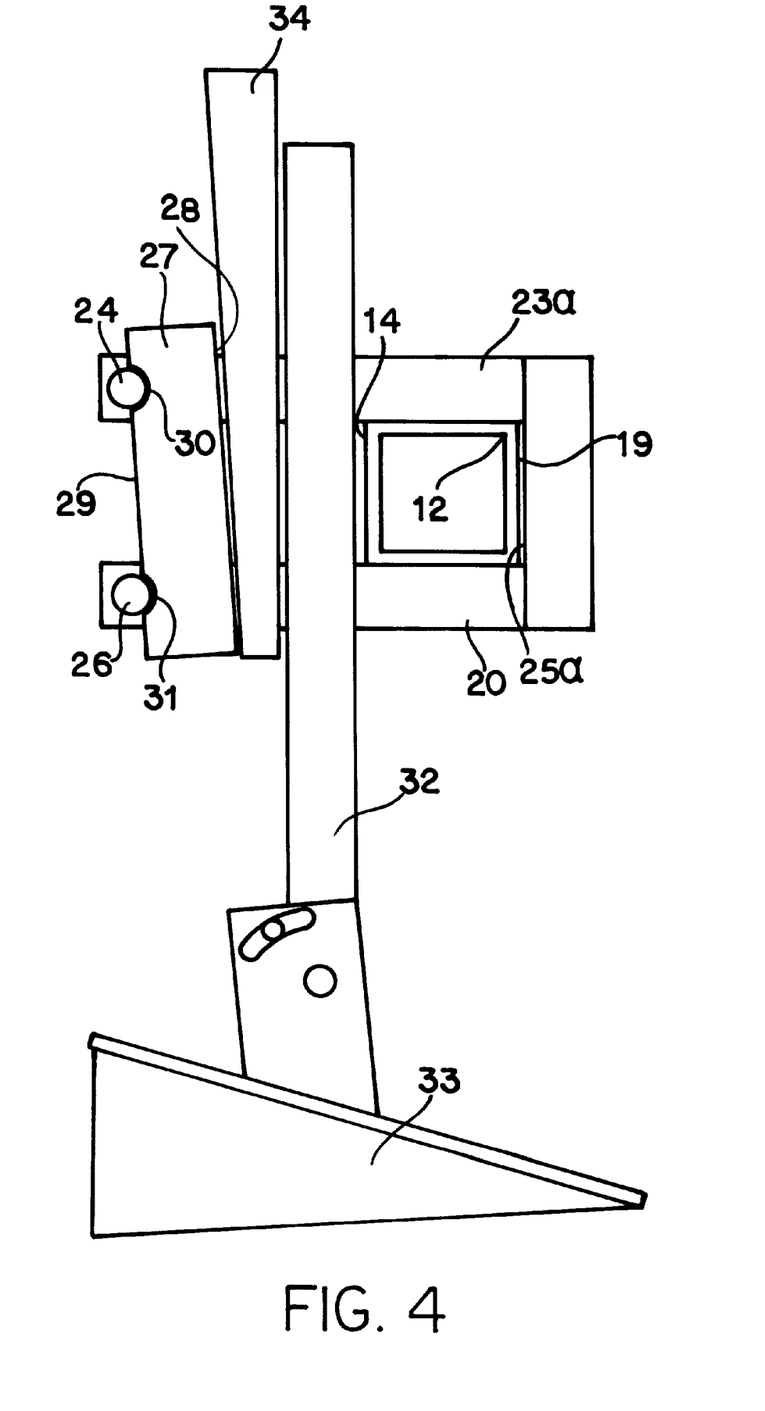
FIG. 4 is a representational side view of a cultivator component clamping assembly according to the present invention.

Referring to FIG. 4, tool shank assembly 15 is shown in a side cutaway view and C-brace 18 is shown including throat 19 which is positioned with throat face 20 positioned against crossbar first face 13. First spaced bar 23a and second spaced bar 25a are shown attached to and extending from opposite ends of throat 19. Tool shank 32 is shown inserted with its inner face positioned against crossbar second face 14. Bar 27 is shown having bar first notch 30 located near a first end of bar 27 and bar second notch 31 located near a second end of bar 27. First pin 24 is shown attached to first spaced bar 23a and second pin 26 is shown attached near the distal end of second spaced bar 25a. Bar first notch 30 is formed having a greater preselected depth than bar second notch 31. This configuration, when tool shank clamp assembly 15 is assembled, causes bar 27 to present an inclined face 28 facing generally toward crossbar second face 14. Wedge 34 is shown inserted between bar inclined face 28 and the outer surface of tool shank 32.

Figure 5:
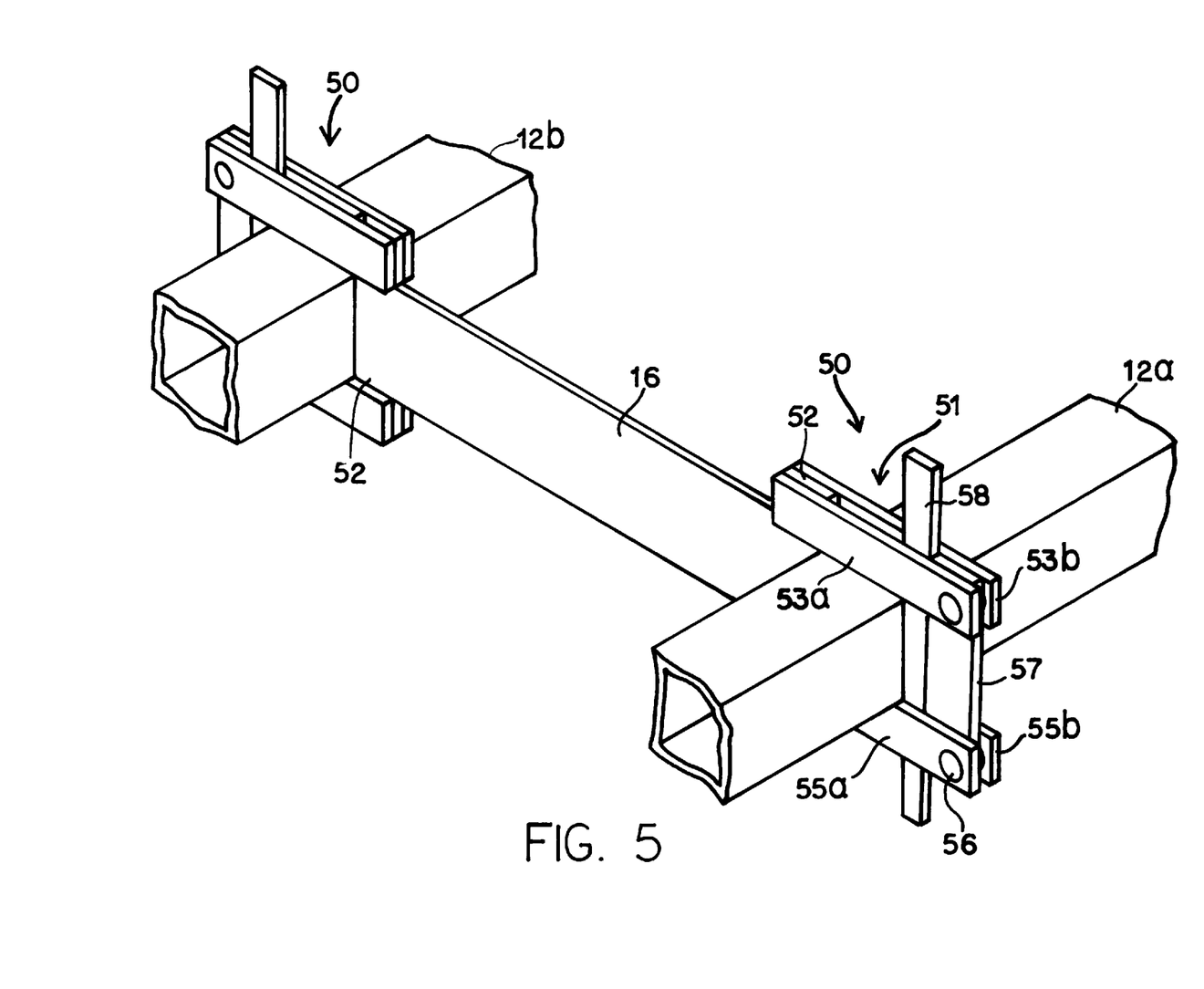
FIG. 5 is a perspective representational view of a cultivator component clamping assembly according to the present invention.

Referring to FIG. 5, front crossbar 12a and rear crossbar 12b are shown attached in sequence and held at a pre-established distance by spacer bar 16. Spacer bar 16 has attached at either of its two ends, spacer bar clamp assemblies 50. Each spacer bar clamp assembly 50 includes C-brace 51, including throat 52 formed at either of the two ends of spacer bar 16. First pair of spaced bars 53a and 53b are attached to and extend from first end of throat 52 and a second pair of spaced bars 55a and 55b are attached to and extend from a second end of throat 52. FIG. 5 also shows spacer bar clamp assembly 50 having bar 57 positioned against first pin 54 and second pin 56 with wedge 58 inserted between a face of crossbar 12a and an inclined face of bar 57.

Figure 6:
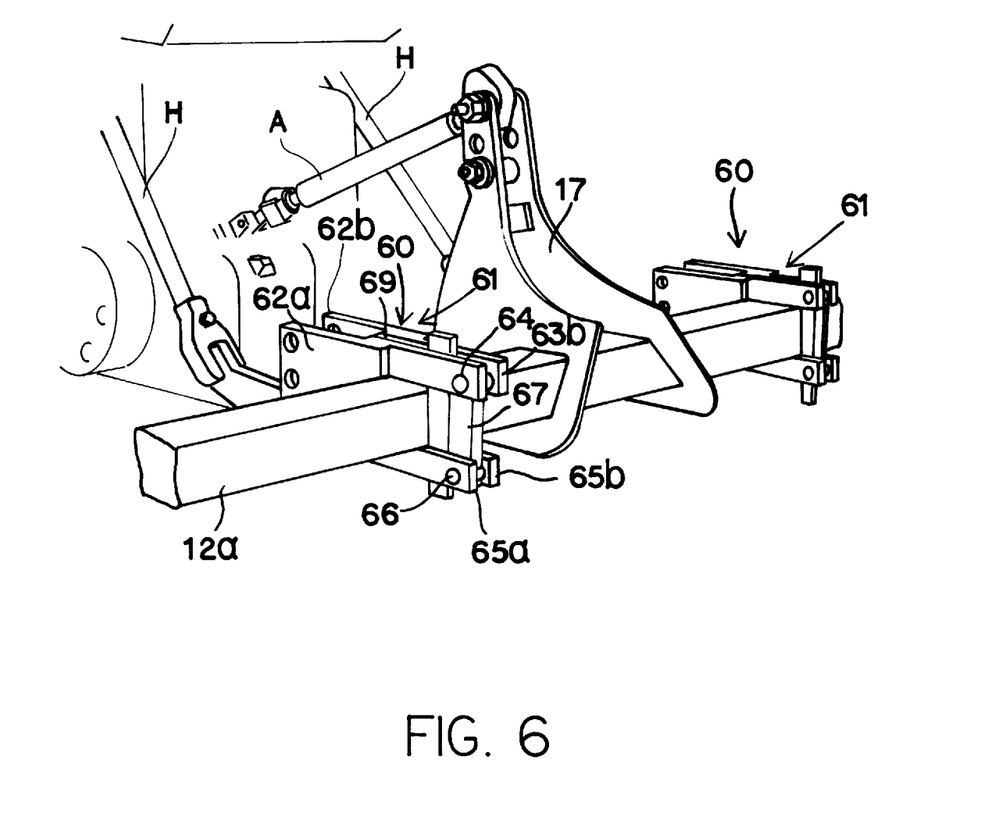
FIG. 6 is a perspective representational view of a cultivator component clamping assembly according to the present invention.

Referring to FIG. 6, hitch plate clamp assemblies 60 are shown attached to first crossbar 12a. Each hitch plate clamp assembly 60 includes generally a C-brace 61 having a throat 69. Attached to either side of throat 69 are hitch pin plates 62a and 62b. Attached to and extending from throat 69 are first pair of spaced bars 63a and 63b and second pair of spaced bars 65a and 65b. Attached near the distal ends of first pair of spaced bars 63a and 63b is first pin 64. Similarly, attached at the distal ends of second pair of spaced bars 65a and 65b is second pin 66. Bar 67 is positioned against first pin 64 and second pin 66. Wedge 68 is positioned between bar 67 and the face of first crossbar 12a.

Figure 7:
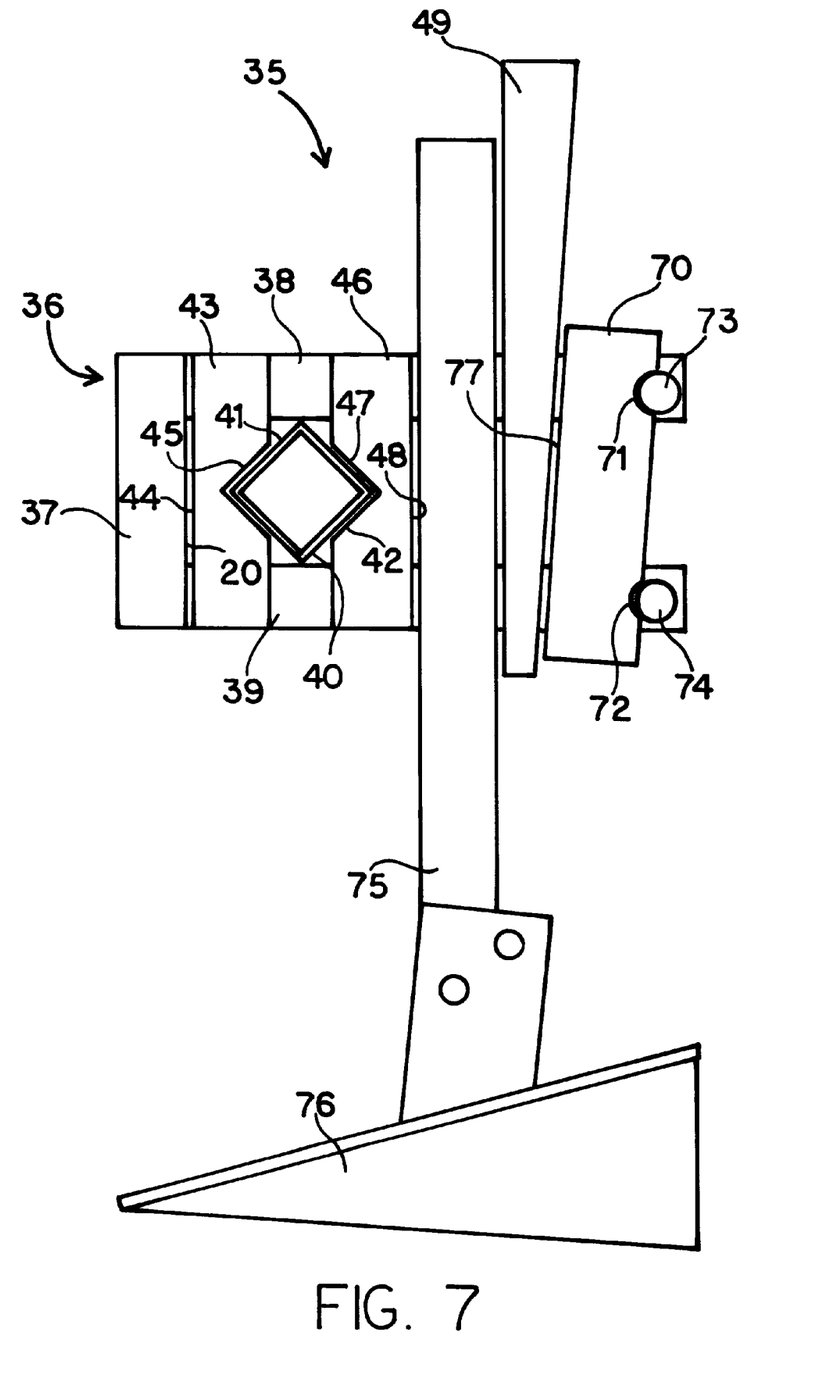
FIG. 7 is a representational side view of a cultivator component clamping assembly according to the present invention.

Referring to FIG. 7, the present invention is shown adapted to a crossbar having a rotated orientation having a diamond cross-sectional configuration. FIG. 7 is a side cutaway representational view of diamond crossbar clamp assembly 35 mounted on diamond crossbar 40. Diamond crossbar clamp assembly 35 includes generally C-brace 36 including throat 37 having first spaced bar 38 attached to and extending from a first end thereof and a second spaced bar 39 attached to and extending from a second end thereof.

C-brace 36 also includes bar 70 having a bar first notch 71 and bar second notch 72. First pin 73 is attached near the distal end of first spaced bar 38 and second pin 74 is attached near the distal end of second spaced bar 39. Bar 70 is positioned so that bar first notch 71 and bar second notch 72 are position against first pin 73 and second pin 74.

FIG. 7 also shows tool 76 having tool shank 75 positioned generally between bar 70 and diamond crossbar 40.

Diamond crossbar clamp assembly 40 also includes first adapter plate 43 and second adapter plate 46. First adapter plate 43 includes a substantially flat interface 44 and a shaped outer face 45 configured to conform to the outside perimeter surface of diamond crossbar 40. Similarly, second adapter plate 46 includes a substantially flat outer face 48 and a shaped inner face 47 also configured to conform generally to the peripheral surface of diamond crossbar 40. As shown in FIG. 7, shaped outer face 45 of first adapter plate 43 contacts first face 41 of diamond crossbar 40 and shaped inner face 47 of second adapter plate 46 is shown contacting second face 42 which opposes first face 41 of diamond crossbar 40.

Wedge 49 is positioned between tool shank 75 and the inclined face of bar 70.

Figure 9:
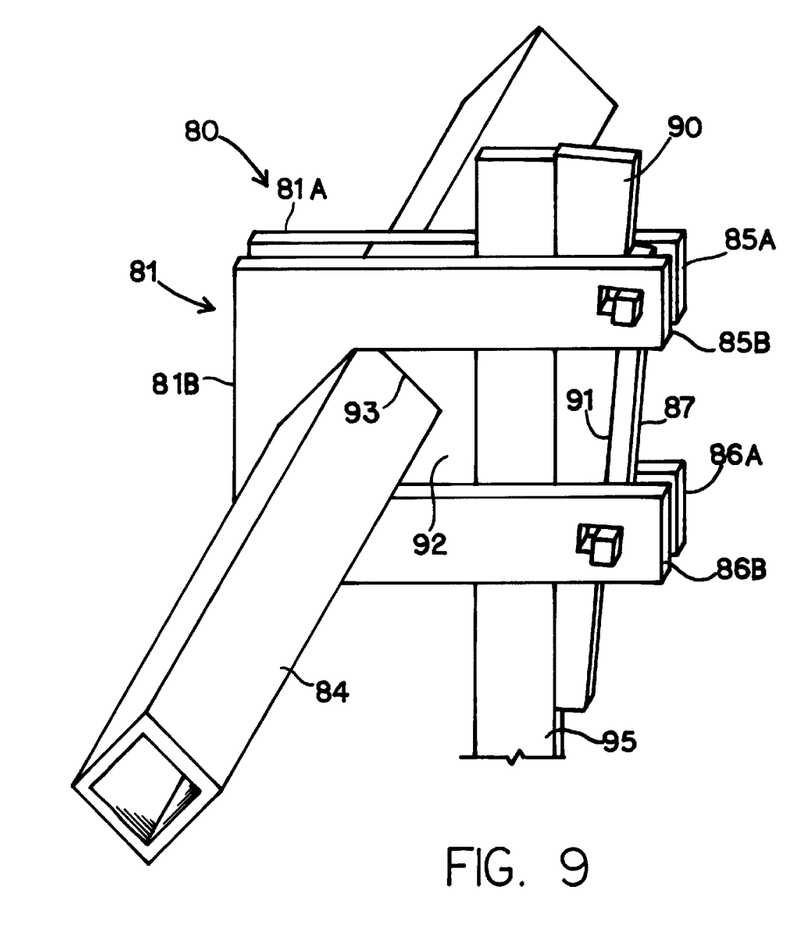
FIG. 9 is a perspective representational view of a cultivator component clamping assembly according to the present invention.

Referring to FIG. 9, tool shank assembly 80 is shown including C-brace 81 having a pair of generally C-shaped members 81a and 81b. C-shaped members 81a and 81b include throat members 82a and 82b respectively which oppose first face 83 of implement crossbar 84. C-shaped members 81a and 81b each include first leg 85a and 85b and second leg 86a and 86b. Wedge 90 is inserted between retaining member 87 and toolshank 95. Adapter plate 92 includes inner face 93 configured to permit surface to surface contact with implement crossbar. It should be appreciated that C-brace 81 may be configured to permit mounting an implement using the device on an implement crossbar having any of a variety of cross-sectional configurations.

Figure 10:
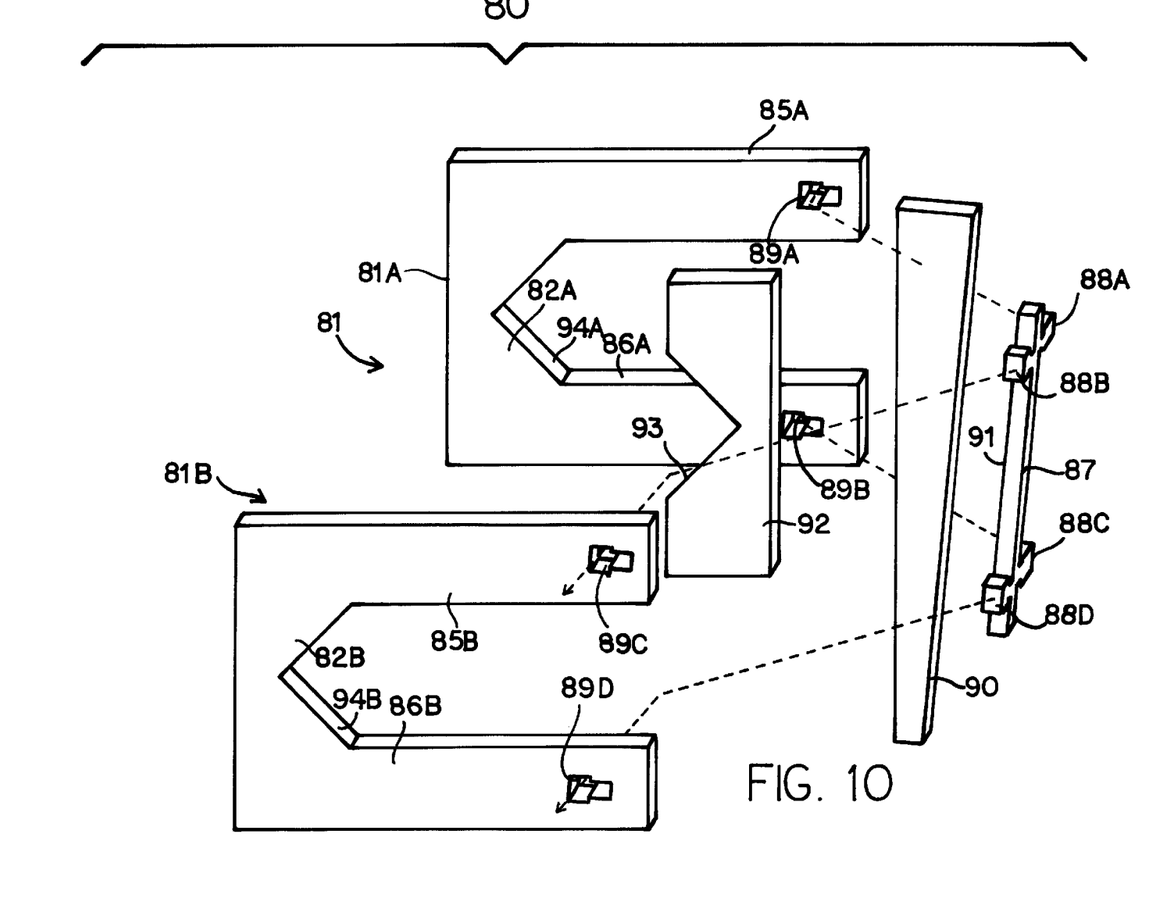
FIG. 10 is an exploded representational side view of a cultivator component clamping assembly according to the present invention.

Referring to FIG. 10, tool shank assembly 80 is shown in an exploded view including C-brace 81 having a pair of generally C-shaped members 81a and 81b. C-shaped members 81a and 81b each include first leg 85a and 85b respectively attached to and extending from throat members 82a and 82b respectively and second leg 86a and 86b respectively attached to and extending from throat members 82a and 82b respectively.

Retaining member 87 includes ears 88a, 88b, 88c and 88d which serve as engaging members for engaging apertures 89a, 89b, 89c and 89d respectively. Ears 88a, 88b, 88c and 88d are shown including enlarged heads 97a, 97b 97c and 97d respectively. Apertures 89a, 89b, 89c and 89d feature a keyhole configuration having an enlarged portions 98a, 98b, 98c and 98d respectively for passage of enlarged heads 97a, 97b 97c and 97d respectively. This configuration permits retaining member 87 to be secured during use without danger of C-shaped members 81a and 81b spreading. Wedge 90 is removably inserted between inclined face 91 of retaining member 87 and adapter plate 92. Adapter plate 92 is shown including inner face 93 configured to permit surface to surface contact between faces 94a and 94b of implement crossbar 84 and inner face 93 of adapter plate 92. Similarly, throat members 82a and 82b are configured to permit surface to surface contact between faces 94c and 94d of implement crossbar 84 and throat members 82a and 82b.

Tool shank assembly 80 is shown including tool shank 95 having tool 96 attached thereto, with tool shank 95 extending between wedge 90 and adapter plate 92.

While this invention has been described with reference to the described embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

I claim:

1. A clamping assembly for removably attaching a component part to an implement crossbar including a face, the clamping assembly comprising:

a pair of generally C-shaped members, each generally C-shaped member having a throat opposing a first face of the implement bar, each C-shaped member including a first leg attached to and extending from the throat and a second leg attached to and extending from the throat;

a retaining member attached to the first and second legs, the retaining member opposing a second face of the implement crossbar;

a first keeper member attached between the first legs; and a second keeper member attached between the second legs, the retaining member held between the pair of generally C-shaped members by the first keeper member and the second keeper member; and a wedge removably inserted between an inclined face of the retaining member and the second face of the of the implement crossbar.

2. The clamping assembly of claim 1 further comprising:

the first keeper member including an aperture formed in the first leg of each C-shaped member;

the second keeper member including an aperture formed in the second leg of each C-shaped member; and the retaining member including a plurality of engaging ears, an engaging ear inserted within the aperture formed in the first leg of each C-shaped member and the aperture formed in the first leg of each C-shaped member.

3. The clamping assembly of claim 1 further comprising:

the first keeper member including a first pin attached between the first leg of each C-shaped member;

the second keeper member including a second pin attached between the second leg of each C-shaped member; and the retaining member including a first pin engaging member engaging the first pin and a second pin engaging member engaging the second pin.

4. The clamping assembly of claim 1 further comprising an adapter member including an inner face and a shaped outer face configured to permit surface to surface contact with the face of the implement crossbar.

5. The clamping assembly of claim 1 further comprising a tool shank attached to a tool inserted between the inclined face of the retaining member and a face of the implement crossbar.

6. A clamping assembly for removably attaching a component part to an implement crossbar including a face, the clamping assembly comprising:

a generally C-shaped brace including a throat having a face, a first leg including a first pair of spaced bars attached to and extending from the throat and a second leg including a second pair of spaced bars attached to and extending from the throat for placement about the implement crossbar, a first keeper member including a first pin attached between the first pair of spaced bars near a distal end of the first pair of spaced bars;

a second keeper member including a second pin attached between the second pair of spaced bars near a distal end of the second pair of spaced bars;

a retaining member including an inclined face opposing the throat of the C-shaped brace having a first end retained against the first pin and a second end retained against the second pin; and a wedge inserted between the inclined face of the retaining member and a face of the implement crossbar opposing the inclined face of the retaining member.

7. The clamping assembly of claim 6 wherein the retaining member further comprises a bar having an outer face, a first end of the bar retained by the first pin and a second end of the bar restrained by the second pin.

8. The clamping assembly of claim 6 wherein the retaining member further comprises:

a bar including a first end and a second end, the bar having an outer face, a first notch formed on the outer face of the bar near the first end of the bar for positioning against the first pin, the first notch having a preselected depth; and a second notch formed on the outer face of the bar near the second end of the bar for positioning against the second pin, the second notch having a preselected depth.

9. The clamping assembly of claim 6 further comprising a first notch having a greater preselected depth than a preselected depth of a second notch.

10. The clamping assembly of claim 6 further comprising an adapter member including an inner face and a shaped outer face configured to permit surface to surface contact with the face of the implement crossbar.

11. The clamping assembly of claim 6 further comprising a tool shank attached to a tool, the tool inserted between the inclined face of the retaining member and a face of the implement crossbar.

12. A clamping assembly for removably attaching a component part to an implement crossbar including a face, the clamping assembly comprising:

a generally C-shaped brace including a throat having a face, a first leg including a first pair of spaced bars attached to and extending from the throat and a second leg including a second pair of spaced bars attached to and extending from the throat for placement about the implement crossbar, a first keeper member including an aperture formed in the first leg of each C-shaped member;

a second keeper member including an aperture formed in the second leg of each C-shaped member; and a retaining member including a plurality of engaging ears, an engaging ear inserted within the aperture formed in the first leg of each C-shaped member and the aperture formed in the first leg of each C-shaped member; and a wedge inserted between an inclined face of the retaining member and the face of the implement crossbar opposing the inclined face of the retaining member.

13. The clamping assembly of claim 12 further comprising an adapter member including an inner face and a shaped outer face configured to permit surface to surface contact with the of the implement crossbar.

14. The clamping assembly of claim 12 further comprising a tool shank attached to a tool, the tool shank inserted between the inclined face of the retaining member and the face of the implement crossbar.

* * * * *